US005694699A

United States Patent [19]
Folson

[11] Patent Number: 5,694,699
[45] Date of Patent: Dec. 9, 1997

[54] BICYCLE FRAME ALIGNING DEVICE

[75] Inventor: Henry J. Folson, Redondo Beach, Calif.

[73] Assignee: Henry James Bicycles, Inc., Redondo Beach, Calif.

[21] Appl. No.: 738,721

[22] Filed: Oct. 28, 1996

[51] Int. Cl.[6] ............................................. G01D 21/00
[52] U.S. Cl. .................................. 33/645; 33/533; 33/613
[58] Field of Search .......................... 33/533, 613, 645, 33/608, 288

[56] References Cited

U.S. PATENT DOCUMENTS

| | | | |
|---|---|---|---|
| 3,925,873 | 12/1975 | Mecum | 29/271 |
| 4,432,144 | 2/1984 | Carlsson | 33/533 |
| 4,517,748 | 5/1985 | Rudolph et al. | 33/533 |
| 4,868,993 | 9/1989 | Kuale | 33/645 |

Primary Examiner—Daniel G. DePumpo

[57] ABSTRACT

A bicycle frame aligning device holds the extremities of the frame at a fixed reference height above a reference plane. The bottom bracket shell is clamped to a mounting shaft pivoted between the shell and the reference plane, so that misalignment of the bicycle frame causes the shaft to tilt from perpendicular to the reference plane. Integral gauges referencing the shaft display the misalignment. The same gauges also display the deflection applied to align the frame to align it. The frame displacements needed to align the frame are applied with a crank attached to a high efficiency jacking screw. The combination of the crank action and integral gauges allows precise incremental alignment effort to be applied, thus making the alignment process more efficient and reducing the chance of buckling the bicycle frame.

6 Claims, 4 Drawing Sheets

BICYCLE FRAME ALIGNING DEVICE

BACKGROUND

1. Field of Invention

This invention relates to bicycles, specifically to the measurement of frame alignment and subsequent alignment of the bicycle frame relative to the longitudinal center plane of the bicycle.

2. Discussion of Prior Art

Bicycles are lightweight, highly stressed structures, subject to being deformed by rough riding and accidents. The common lightweight tubular bicycle frame typically consists of an assembly of 10 tubes welded or brazed together, a combination which leads to distortion of the frame from the central vertical plane of the bicycle frame during production. It is common for manufacturers to perform a straightening operation on all frames produced. A bicycle may be out of alignment as made, or become so under normal usage. In extreme cases, the handling is affected to the point of creating a dangerous tendency to turn or pull to one side. Pedaling efficiency can suffer from even small degrees of misalignment. There is thus a need to measure the alignment of bicycles and then realign the frame as needed.

Bicycle alignment is measured relative to the central vertical plane of the bicycle. The fork ends ideally center the wheels on the central vertical axis. The central movement axis and the rear axles should be perpendicular to the central vertical plane, and bisected by it. Most alignment systems are based on the central movement, and the alignment of the head tube, outer end of the seat tube, and the rear fork ends are measured and corrected relative to the central movement.

Bicycle frame alignment devices include a flat table or a narrow beam which determines a horizontal reference plane for aligning the bicycle frame. Tables offer the advantage that the frame does not need to be relocated during alignment. Beam designs require that the frame be relocated over the beam as each area is checked or realigned. Beam designs offer the advantage of lower cost, better portability and easier storage, due to its lighter weight and smaller size.

With either approach, extending perpendicular to the horizontal reference plane, is a stepped mounting shaft such that one side of the shell is supported by the step and to which the bottom bracket shell of the bicycle frame is held by a clamping means. The functionality of the device depends in large part on the rigidity of this shaft. The diameter of the shaft is limited by the inside diameter of the standard bottom bracket shells. Additionally, the shaft is cantilevered from the reference plane, so it is relatively flexible.

The bicycle frame thus extends parallel to the reference plane, if it is in alignment. Various standard height gauges are used to determine the alignment of the frame relative to the reference plane. These gauges are not attached to the device, so are subject to accidental damage and loss. These gauges actually measure the position of the sides of the tubes, so a compensation must be made to determine the actual center lines of the tubes. Additionally, because of the large deflections that occur at the perimeter of the bicycle frame, these gauges typically cannot measure the deflections that occur during the bending of the frame.

To align the frame, long leverage bars are inserted into the head tube and the seat tube, and body weight is applied to realign the frame. If the frame is misaligned towards the reference plane, the frame must be unclamped, turned over, and reclamped. Because of the forces involved, the table or beam must be very firmly and stably mounted.

A high level of skill is needed to determine how much force and deflection to apply to the frame to straighten it. With the constant development of lighter weight bicycle frames made from higher strength materials, the tube walls are now thinner, and the tube diameters are often larger. The tubing is thus more likely to buckle than bend when it is overstressed.

The head tube is about 24 inches (60 cm.) from the bottom bracket shell, so the deflections involved in the straightening process are several inches at the head tube, making it difficult to determine how far the frame has been deflected. When the frame appears to have been aligned, the alignment accuracy is checked with the gauges. If the frame must be straightened more, there is no record of how far the frame was deflected the last time. This can lead to wasteful small attempts or over-straightening and possibly buckling of the frame.

Objects and Advantages

Accordingly, several objects and advantages of my invention are:

(a) to apply the bending or straightening loads at the bottom bracket shell where the movements required are much less than at the extremities of the bicycle frame;

(b) to provide a frame support to hold the extremities of the frame at a set distance above the reference plane when needed, so that any misalignment of the frame will put a tilting force on the bottom bracket shell mounting shaft;

(c) to provide a mounting shaft for the bottom bracket shell pivoted about a swivelably mounted pivot pin located between the bicycle frame and the reference plane, thus allowing frame misalignment to cause the mounting shaft to tilt from perpendicular to the reference plane;

(d) to simply support the bottom bracket shell mounting shaft at each end, instead of the usual cantilevered configuration, to minimize the shaft deflection;

(e) to provide integral gauges located at the bottom bracket shell to both display the status of the alignment and measure the deflections applied during the alignment process, thus taking advantage of the smaller deflections experienced at the the bottom bracket shell;

(f) to have the loads created during the alignment process reacted within the device, so that how rigidly the device is mounted is not as critical;

(g) to provide an alignment device that can use either a beam or a table for the base;

(h) to allow the realignment deflections to be applied with precise control by a crank turning a high efficiency jacking screw means;

(i) to allow the frame to be aligned in either direction by turning the crank clockwise or counterclockwise so the frame never needs to be turned over.

Further objects and advantages are that the amount of misalignment can be easily determined, and the direction to turn the crank for corrective action is easily determined.

DRAWING FIGURES

Figure 1:
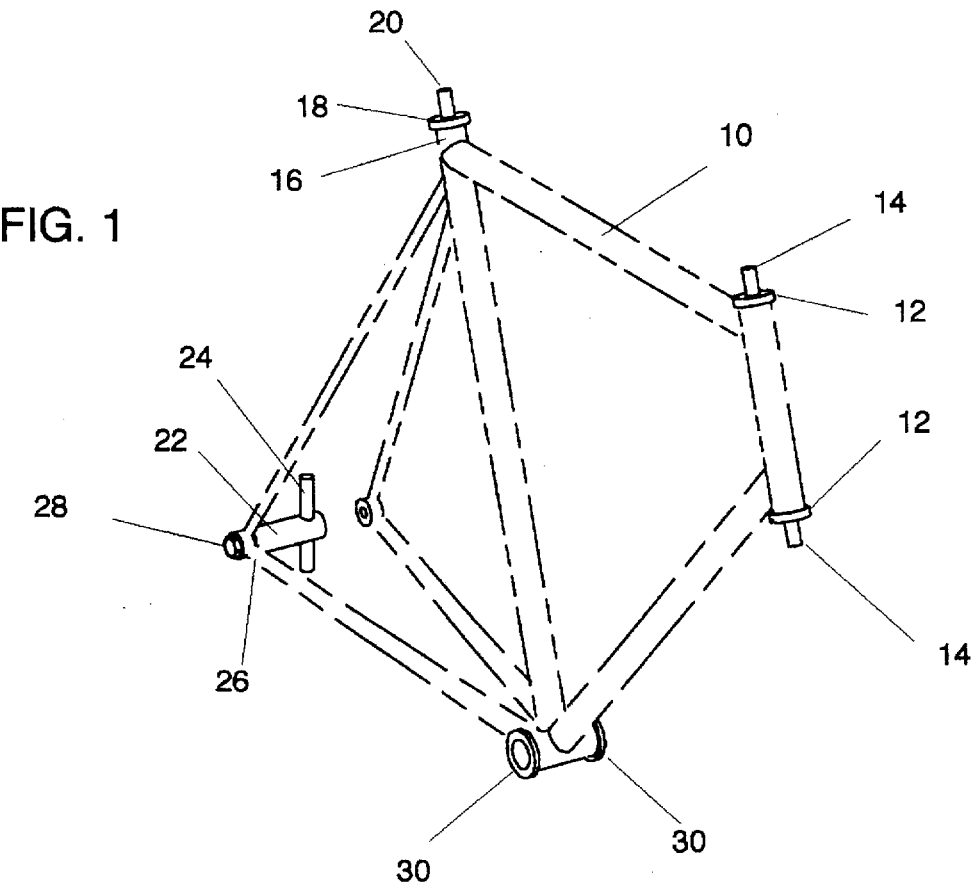
FIG. 1 is a perspective view of a bicycle frame with temporary center-determining inserts installed.

| Reference Numerals in Drawings | |
|---|---|
| 10 bicycle frame | 56 tee slot |
| 12 temporary head tube insert | 58 tee nut |
| 14 cylindrical extension | 60 tower |
| 16 outer end of seat tube | 62 ball joint rod end |
| 18 temporary seat tube insert | 64 retaining bolt |
| 20 cylindrical extension | 66 horizontal reference plane |
| 22 dummy rear axle | 68 adjustment nut |
| 24 perpendicular cylindrical extension | 70 locking bolt |
| 26 rear fork end | 72 swivel shaft bolt |
| 28 bolt | 74 ball nut |
| 30 dummy shell cup | 76 pivoted ball nut adapter |
| 32 stepped mounting shaft | 78 ball nut pivot pin |
| 34 base | 80 yoke |
| 36 swivel shaft | 82 thrust bearing |
| 38 pivot pin | 84 yoke bolt |
| 40 lockable adjusting nut | 86 clevis pin |
| 42 shaft extension | 88 dial gauge support |
| 44 clamping bolt | 90 dial gauge adjustment bolt |
| 46 ball nut support frame | 92 dial gauge tip |
| 48 ball screw | 94 oblong hole |
| 50 crank | 96 dummy frame |
| 52 dial gauge | 98 adjusting screw |
| 54 frame support | 100 top surface |

Figure 2:
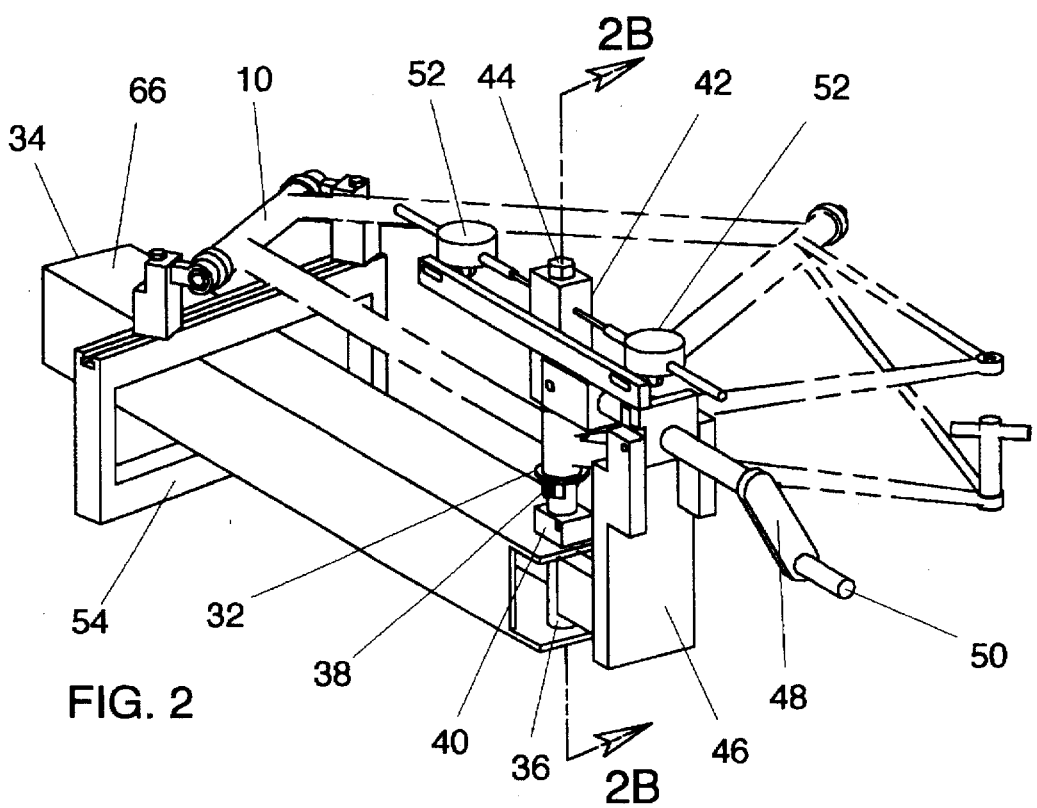
FIG. 2 is an overall perspective view of the aligning device with a frame in place.
Figure 2A:
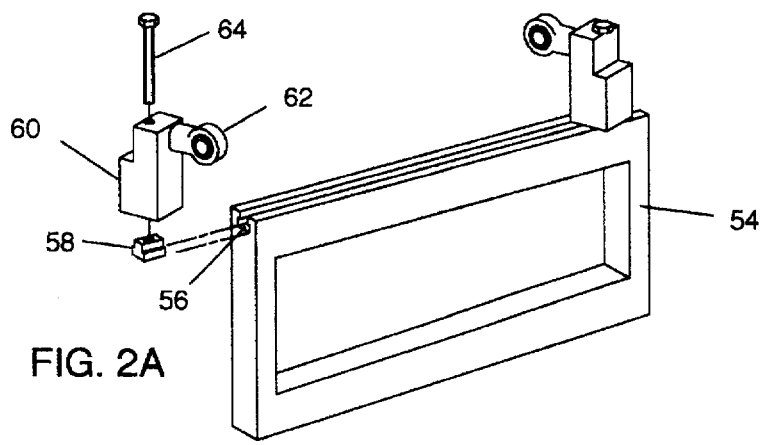
FIG. 2A is a partially exploded view of the frame support.
Figure 2B:
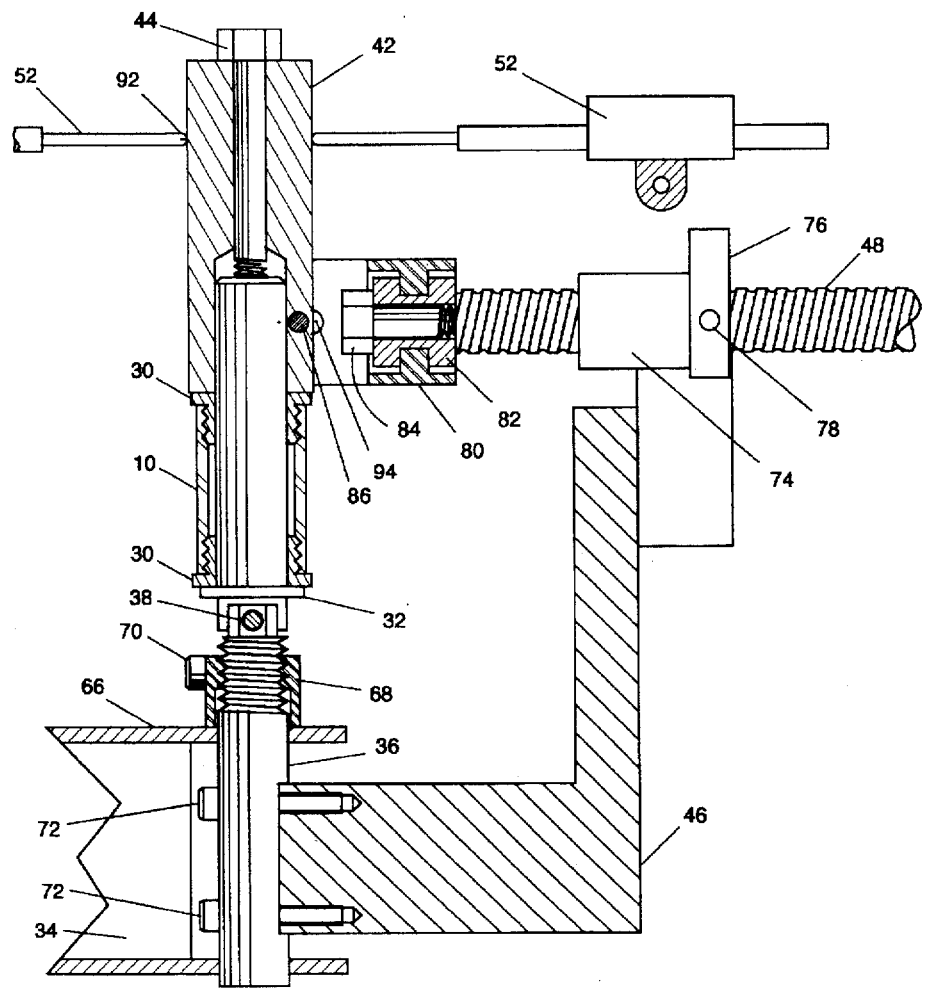
FIG. 2B is a cross section view of the bottom bracket shell support area of the device.

DESCRIPTION FIGS. 1 to 2B

FIG. 1 shows a bicycle frame 10 prepared for measurement and alignment. Temporary head tube inserts 12 having cylindrical extensions 14 on the center line of the inserts are inserted into the head tube. The outer end of the seat tube 16 has installed a temporary insert 18 having a cylindrical extension 20 on its center line which is the same diameter as the cylindrical extensions 14. A dummy rear axle 22 having a perpendicular double-ended cylindrical extension 24 through the axle located at the theoretical distance from the inside face of the fork end to the center line of the bicycle frame is inserted into the rear fork ends 26 and a bolt 28. Dummy bottom bracket shell cups 30 having an inside diameter to slidably fit stepped mounting shaft 32 are screwed into the bottom bracket shell.

FIG. 2 illustrates a typical embodiment of the present invention. A slidable frame support 54 fits over base 34. The top surface of the base is the horizontal reference plane 66. A swivel shaft 36 extends through the base. A stepped mounting shaft 32 having a pivot pin 38 connects the mounting shaft to the swivel shaft.

FIG. 2A is a detail view of the frame support. Frame 54 has a tee slot 56 along its uppermost surface, into which tee nuts 58 slidably fit. A pair of towers 60 which can be rotated about retaining bolts 64 have ball joint rod ends 62 or similar projecting at the desired distance above the horizontal reference plane 66. Said rod ends slidably accept the cylindrical extensions 12, 20, and 24. Retaining bolts 64 screwed into the tee nuts lock the towers to the frame 54 to prevent translation or rotation.

FIG. 2B is a cross-section view of the bottom bracket support area. Swivel shaft 36 passes perpendicularly through the base 34 and is located vertically by a lockable adjusting nut 68 having a locking bolt 70. The stepped shaft 32 is pivoted about the pivot pin 38. The frame 10 with the optional dummy cups 30 is clamped to the shaft by a bolt 44 acting on a shaft extension 42 which fits slidably over the stepped shaft 32. Swivel shaft bolts 72 secure the ball nut support frame to the swivel shaft 36. A ball nut 74 is mounted in a pivoted ball nut adaptor 76 which pivots at ball nut pivot pin 78 on the ball nut support 46. A yoke 80 containing a pair of thrust bearings 82 is connected to the ball screw 48 by a ball screw bolt 84. A clevis pin 86 passing through a hole in the shaft extension 42, and through a pair of oblong holes 94 in the yoke 80, to connect the ball screw 48 and the stepped shaft 32. Extending horizontally from the ball screw adaptor 76 is a dial gauge support bar 88 to which the dial gauges 52 are attached by dial gauge adjustment bolts 90, such that when the stepped shaft 32 is perpendicular to the horizontal reference plane 66, a dial gauge tip 92 on each dial gauge touches the shaft extension 42, and the dial gauges read zero. The geometry of the components shown in this view is such that, when bolt 44 is removed, pushing down on the handle end of ball screw 48 will allow the shaft extension 42 and the dial gauge support 88 and the dial gauges to swing clear of the stepped shaft 32 to a stable position held by gravity, so that the bicycle frame 10 can be removed or replaced.

Operation—FIGS. 1 to 6

Bicycle frame alignment is an incremental process of alternating measurement and then alignment in which the frame is flexed until it yields and assumes a new alignment. In the use of this device, temporary inserts which relate to the vertical center plane of the bicycle frame are placed in the head tube, seat tube, and rear fork ends. When better accuracy is required, the dummy shell cups 30 are screwed into the bottom bracket shell, as shown in FIG. 1.

Figure 3:
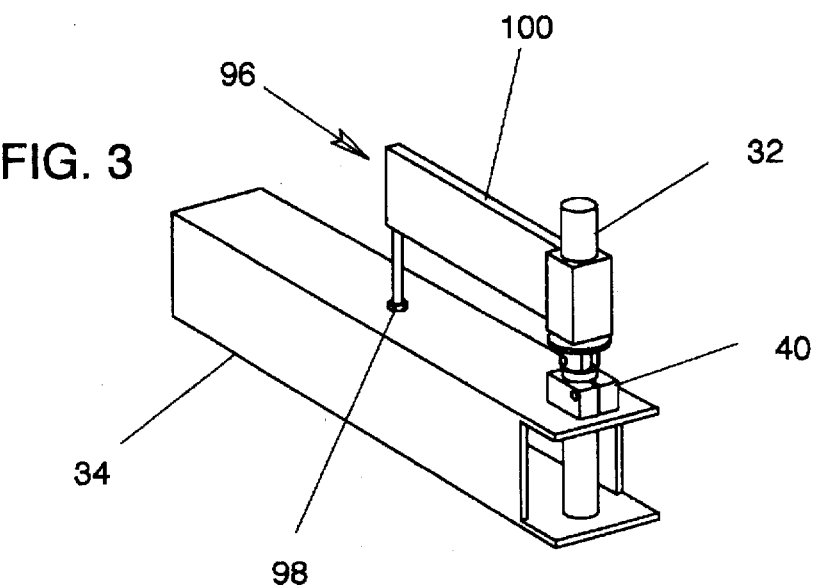
FIG. 3 shows a dummy frame used to set the dial gauges to read zero when the frame is properly aligned.

To aid in setting the dial gauges 52 to zero, a dummy frame 96 as shown in FIG. 3 can be used. The dummy frame has a height equal to the width of the bottom bracket shell. It is clamped into the device as a frame would be. (The clamping means are omitted from the figure for clarity.) An adjusting screw 98 is used to set the center line of the distal end of the dummy frame to the desired height above the horizontal reference plane 96. The lockable adjusting nut 40 is adjusted so that the top surface 100 is parallel to the horizontal reference plane 66. The ball screw 48 can be rotated put a light load on the dummy frame, thus holding the stepped shaft 32 and its extension 42 perpendicular to the reference plane while the dial gauges 52 are set to zero.

FIG. 2 shows a frame in position for measurement and alignment of the down tube of the frame 10. In this device, the dial gauges 52 show only a relative measurement of any displacement of the frame extremity in the frame support 54 out of the central vertical plane of the frame. Usually there is no need to know the precise error at the extremity of the frame, so a relative measurement is adequate. Depending on which way the frame is misaligned, one or the other of the gauges will display a positive reading. The use of two opposed dial gauges makes it easier to know which way to turn the crank to reduce the error to zero, or close to zero. The crank is turned clockwise or counterclockwise as needed to cause the positive dial gauge reading to go towards zero. Normally the frame will only be flexed elastically as this dial gauge reaches zero. To flex the frame far enough to cause a permanent resetting of the alignment, the crank is turned more until the opposing dial gauge begins to show a positive reading. Experience has indicated that an operator unskilled in the use of this device can safely turn the crank until the now positive reading dial gauge reads about 0.2" displacement.

At this point, the crank 50 is reversed and the elastic force of the frame helps back-drive the ball screw until the frame sees little or no load from the ball screw. The operator then turns the crank until the clevis pin 86 is centered in the oblong holes of the yoke 80. In this relaxed condition of the frame, the reading of the dial gauges is again observed. If no change is noted, the process is repeated, going back to the original 0.2" displacement of the opposing gauge. Now the crank is turned another increment of about 0.2" farther on the opposing gauge. Again the crank is reversed, and the loads removed so the gauges can be read. This process continues incrementally until a reduction in the alignment error is observed. The final increments of travel used will depend on how much displacement was needed to begin to reduce the error, and how much error remains to be corrected. The operator skill required to learn how big increments can be safely used can be learned in aligning a only few frames.

Figure 4:
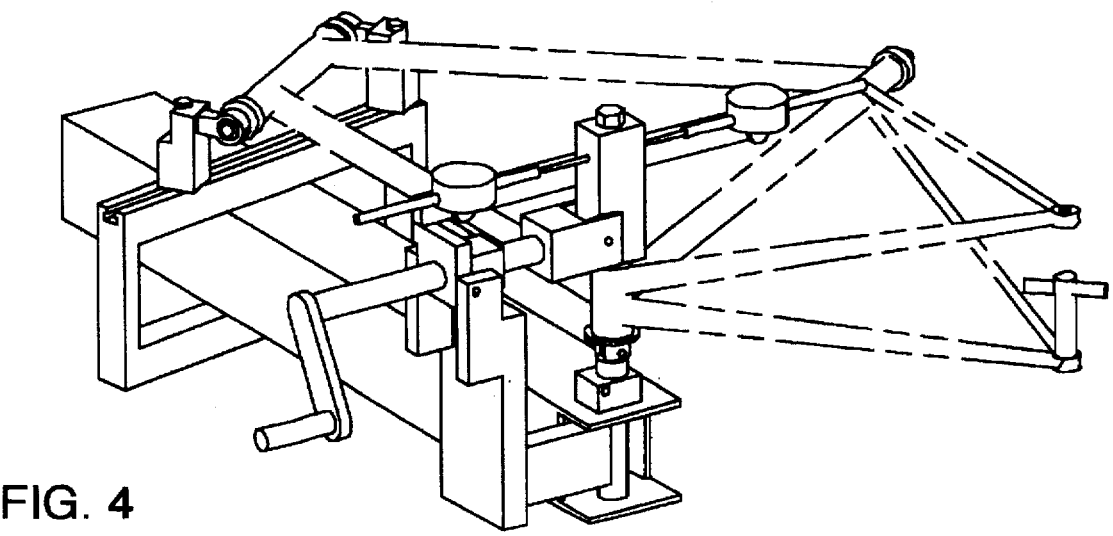
FIG. 4 shows the device adjusted to measure and correct any twist of the head tube.

The aligning done in FIG. 2 will correct misalignment of the head tube caused by the down tube being out of the central vertical plane of the frame. There can also be a twisting of the head tube out of the plane. FIG. 4 shows the ball screw swiveled at about 90° to the axis of the down tube. This is achieved by loosening the clamping bolt 44, swinging the ball screw around 90°, and retightening the clamping bolt. Now the dial gauges provide a relative measurement of twist in the head tube. The alignment process is the same as described above.

Figure 5:
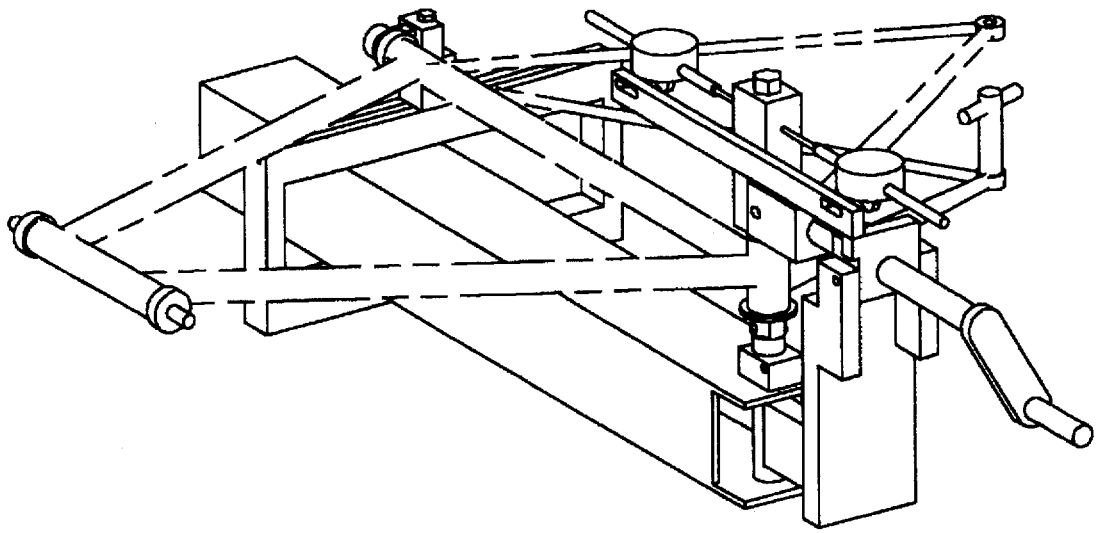
FIG. 5 shows the device adjusted to measure and correct misalignment of the seat tube.

To align the seat tube, the clamping bolt 44 is again loosened, and the ball screw swivelled around until the axis of the ball screw is approximately aligned with the seat tube. The clamp bolt is retightened. The retaining bolts 64 on the frame support 54 are loosened to free the head tube. One tower is moved, rotated and locked as shown in FIG. 5 to accept the outer end of the seat tube 16. The dial gauges now provide a relative reading of the alignment of the seat tube relative to the central plane of the frame. The measurement and alignment process is the same as already described.

Figure 6:
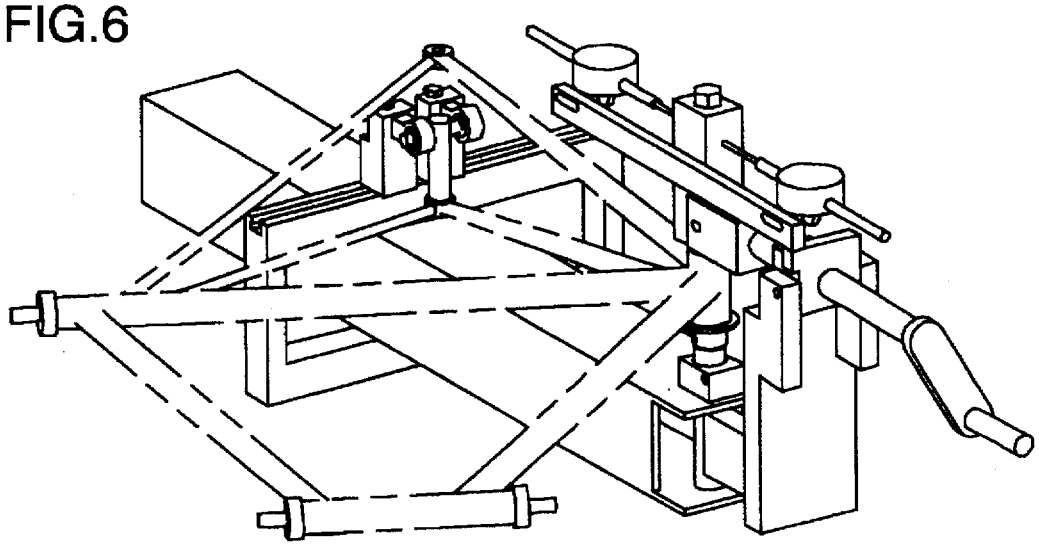
FIG. 6 shows the device adjusted to measure and correct misalignment of the rear fork ends.

To align the rear fork ends, a dummy rear axle 22 of the desired length must be bolted to one of the rear fork ends 26. The clamping bolt 44 is again loosened, and the ball screw is swivelled around until its axis approximately lines up with the rear fork ends. The clamp bolt is retightened. The seat tube is freed from the frame support 54, and the towers are repositioned and locked as shown in FIG. 6. To provide stability, each end of the cylindrical extension 24 must be supported in a rod end 62. The dial gauges now provide a relative reading of the alignment of the rear fork end. Measurement and alignment are performed as before. Once one fork end is aligned, the rear dummy axle 22 is removed and bolted into the other rear fork end, and the process is repeated.

This completes the alignment procedure.
Summary, Ramifications, and Scope

Whether the alignment steps require bending a tube, twisting a tube, or changing the offset of a fork end, the thinking and actions required are consistent. The ability to use the gauges to determine how much more displacement is needed to achieve alignment speeds up the operation and helps ensure that a frame will not be buckled by excess loading. This new alignment device is therefor fast and efficient to use.

Although not described, it is clear that this device can use a table rather than a narrow beam as in the preferred embodiment, should this be desired.

Although the description above contains many specificities, these should not be construed as limiting the scope of the invention but merely providing illustrations of some of the preferred embodiments of this invention. Thus the scope of the invention should be determined by the appended claims and their legal equivalents, rather than by the examples given.

I claim:

1. A device for aligning bicycle frames comprising:

a.) a horizontal reference plane;

b.) a slidable frame support means for holding the extremities of the frame a fixed height above the plane as needed;

c.) temporary inserts which fit in both ends of a head tube of the frame and the outer end of a seat tube of the frame, said inserts each having a cylindrical projection located at the center of a tubular portion of the frame it is inserted into and which mates with the frame support;

d.) a dummy axle that fits in rear fork ends of the bicycle frame, said dummy axle having at least one cylindrical projection centered between the fork ends and which mates with the frame support;

e.) a mounting shaft to which a bottom bracket shell of the frame is clamped, said mounting shaft being swivelably pivoted between the bottom bracket shell and the reference plane such that misalignment of the frame causes the shaft to tilt from perpendicular to the plane;

f.) displacement measuring gauges referencing one of the upper end of the shaft and an extension thereof, such that the amount of misalignment is indicated, said gauges also indicating the deflection of the frame as it is being aligned;

g.) means to apply force to the shaft about the pivot to align the frame.

2. The device of claim 1 in which a ball screw operated by a rotation means runs through a ball nut to apply the force to deflect the frame during alignment, acting though a low friction thrust bearing and yoke on a clevis pin which extends through an extension of the bottom bracket support shaft, said ball screw having low enough friction losses to allow back-driving to occur when the handle is released after aligning the frame, such that the elasticity of the frame will return the frame close to a position at which it experiences little or no deflection from the ball screw.

3. The device of claim 2 in which the ball screw rotation means is a hand operated crank.

4. The device of claim 1 in which the yoke has a pair of oblong slots aligned with the axis of the ball screw such that there is a visible amount of free play between the yoke and the clevis pin, allowing the ball screw to be turned until the clevis pin floats in the oblong slot, such that the yoke and screw assembly apply no load on the clevis pin and in turn the shaft, allowing the gauges to indicate the alignment of the bicycle frame under no load conditions.

5. The device of claim 1 in which the reference plane is a narrow beam, such that one universal frame support means is used to support in turn the head tube, the outer end of the seat tube, and the rear fork ends.

6. The device of claim 1 in which vertical adjustment means on the swivel shaft compensate for varying bottom bracket shell widths by raising or lowering the bottom bracket shell so that the center line of the shell is located at the desired reference height above the horizontal reference plane.

* * * * *